Figure 4:
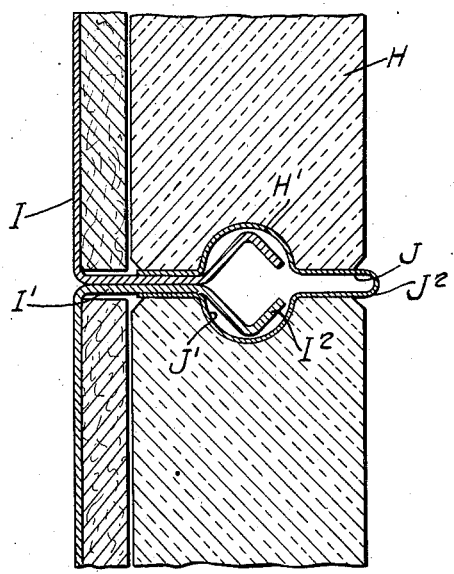

Dec. 7, 1937.                C. G. DUFFY                2,101,612
                           PANEL MOUNTING
                    Filed Aug. 22, 1936        4 Sheets-Sheet 1
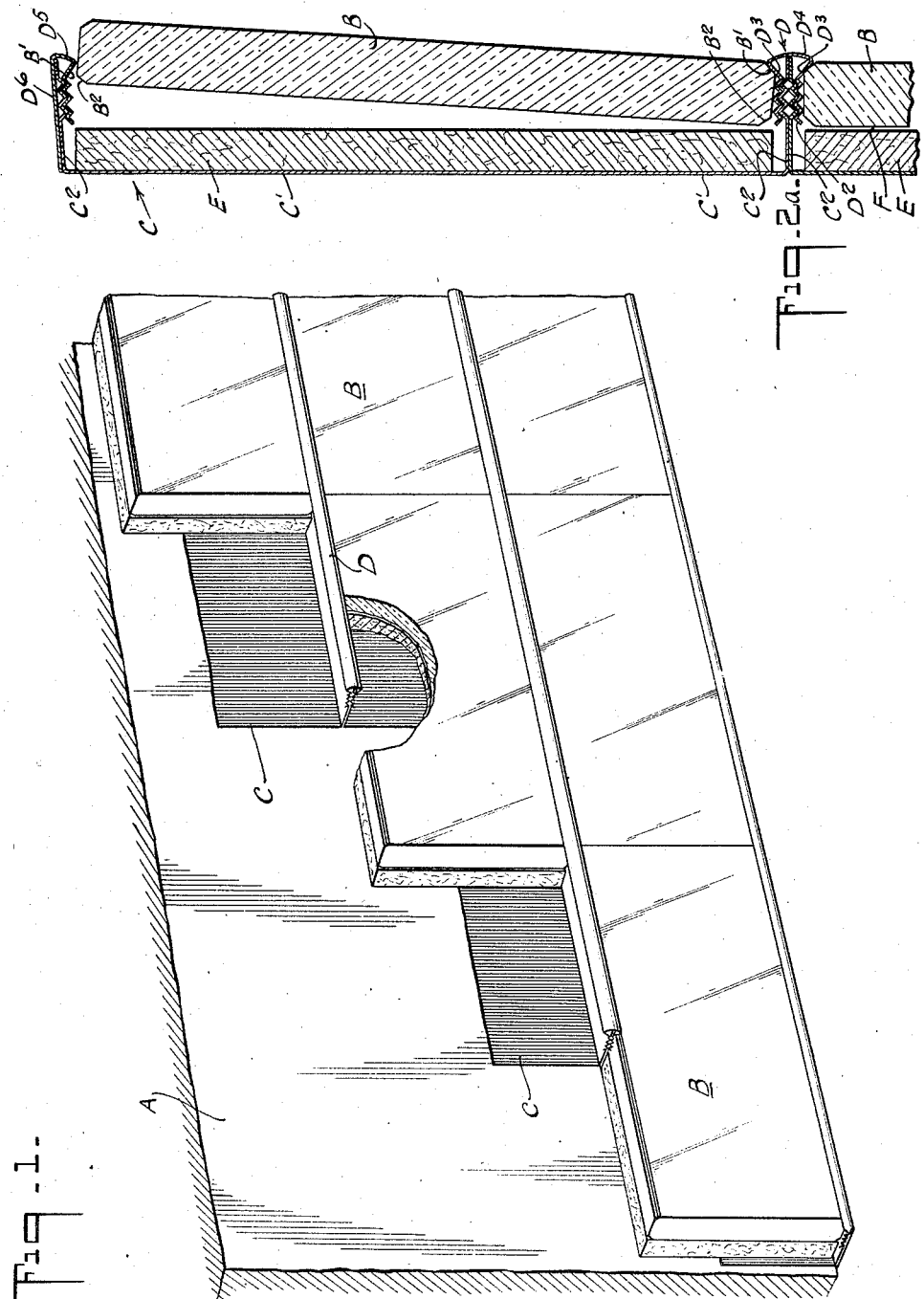
INVENTOR
Charles G. Duffy
BY
Morrison, Kennedy & Campbell
ATTORNEYS

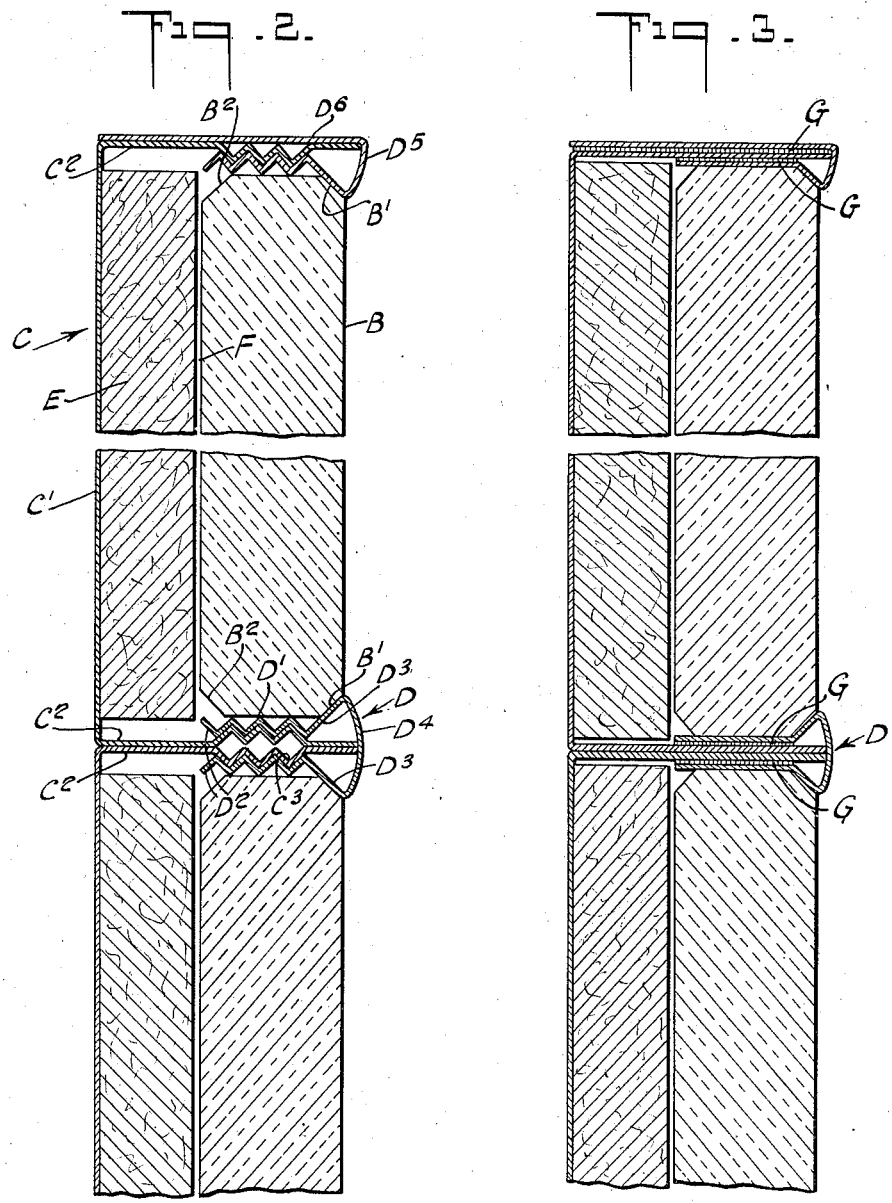

Dec. 7, 1937.      C. G. DUFFY      2,101,612
PANEL MOUNTING
Filed Aug. 22, 1936      4 Sheets-Sheet 3

INVENTOR
Charles G. Duffy
BY
Morrison, Kennedy & Campbell
ATTORNEYS

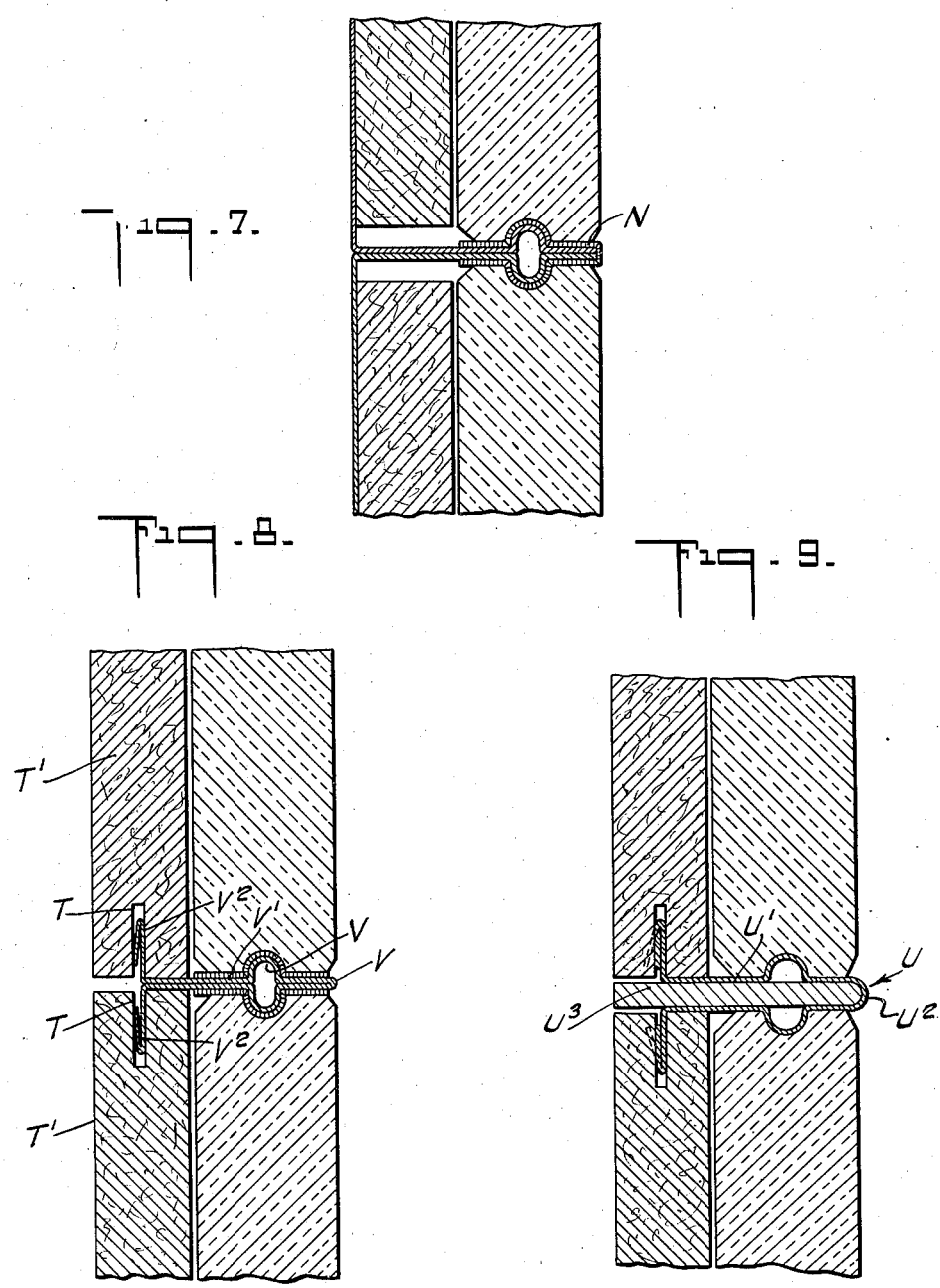

Patented Dec. 7, 1937

2,101,612

UNITED STATES PATENT OFFICE 2,101,612

PANEL MOUNTING

Charles G. Duffy, Brooklyn, N. Y., assignor to Sealed Joint Products Co., Inc., a corporation of Delaware Application August 22, 1936, Serial No. 97,473

21 Claims. (Cl. 72—19)

This invention relates to mountings for facing members, as for instance, tiles, panels or the like, adapted to be used in the veneering of walls, ceilings, etc.

According to the present improvements, a panel or series of panels, which may be made of glass, ceramic material or indeed any material suitable for the purpose, is anchored in place by means of metal devices formed with beads that engage the panel members at the edges, the metal devices being of a resilient construction to permit the panel members to be snapped into place.

In several embodiments of the invention, the facing or panel members are supported in place by channel members disposed in parallel arrangement with their adjacent flanges in close proximity. The adjacent flanges are covered or enclosed by an element, in the nature of a clip that snaps on over the flanges, and which presents a pair of oppositely extending beads serving to hold the panels in place either by engaging in grooves formed in the edges thereof or by engagement with their outer edges. The outer portions of these clips, in most instances, will be exposed to view when the panels are in place and will appear as a continuously running strip between courses of adjacent panels. By employing some metal, as for instance stainless steel, for these clips, a very handsome effect is produced, particularly when the panels are suitably colored to harmonize. The long clip members also serve to prevent moisture from passing in between adjacent panels and, for purposes of insulation, slabs of material, as for instance pressed fiber board or asbestos board, are preferably placed in the base of the channel members at the rear of the panel units. Various expedients may be employed for holding the clip members in place on the channel members. In some of the embodiments illustrated, the metal clips are secured by interlocking devices formed in the clips and in the channel members, while in other embodiments an industrial adhesive tape is employed, which has been found admirably suited for the purpose.

In other embodiments of the invention, the channel members are dispensed with and a clip is used having oppositely extending flanges, by means of which the clip is held in place by the pressed board backing either by locating the flanges at the rear of the pressed board slabs when the latter are secured in place, or by the engagement of the flanges in slots formed in the opposed edges of adjacent pressed board slabs.

In all cases, regardless of whether clips are employed with channel members or without, those elements that present the bead portions for retaining the panels in place are yieldable to permit the panels to be snapped in place and returnable into their original positions, wherein the bead portions will engage in the grooves of the facing panels or in advance of the forward edges thereof, thus securing them firmly in position.

Referring to the drawings:

Fig. 1 is a perspective view of a portion of a wall having a facing employing the present improvements;

Fig. 2$^a$ is a vertical section through a panel member and its retaining elements, and illustrating the manner in which the elements are snapped into place; and Figs. 2 to 9 are vertical sections through facing members, illustrating the invention in a number of its different embodiments.

In Fig. 1, there is illustrated a section of a wall A faced or veneered with tiles or panels B of suitable material, as for instance, glass, ceramic material, etc., supported by channel members C and anchored in place by means of retaining clips D that engage the respective panels at their upper and lower edges.

As shown more in detail in Fig. 2, the channel members C have a base portion $C^1$ formed at its opposite edges with flange portions $C^2$ and are arranged in parallel relation with the flanges of two adjacent channel members in contact or at least in close proximity to each other. The channel members are secured to the backing structure A, which may be by way of example, a concrete wall, by suitable means (not shown). Each channel member is provided adjacent its base $C^1$ with a slab E of pressed fiber board or asbestos board acting as an insulator and which may be cemented or otherwise suitably secured in the channel member.

As illustrated in Fig. 2, the flanges $C^2$ of the channel members are formed somewhat inwardly from their outer edges with a series of opposed longitudinal corrugations $C^3$, which serve to retain in place the clips D, which are likewise formed with opposed corrugations $D^1$ complementary to those in the channel flanges $C^2$. The clips may be as long as desired, i. e., they may span a series of panel members and are snapped in position over the ends of a pair of flanges, so that the corresponding corrugations in the clips and the flanges are in interlocking engagement. There is sufficient resiliency in the clips to allow them to spread as they are snapped into position over the flanges and to cause them to snap back into shape and in intimate engagement with the adjacent portions of the flanges when the clips have been properly located. Looking at the clips D in cross section, it will be noted that the inner or free edges thereof flare outwardly, as at $D^2$, to facilitate the snapping action just alluded to.

The clips D adjacent their outer portions are formed with a pair of inclined faces $D^3$ connected together by a crown portion $D^4$, the latter portion being exposed in the finished wall and serving as a trim strip between adjacent courses of panel members. The faces $D^3$ and the crown portion $D^4$ together form a pair of oppositely extending beads which cooperate with the panel members to hold the latter in place, it being noted that the panel members themselves may have bevelled edges $B^1$ at the front, which in service engage the inclined faces $D^3$ of the clips D. The panel members may also be formed with bevelled edges $B^2$ at their inner edges, in order to facilitate inserting them in place between a pair of opposed flange members. In this connection, it might be observed that, in order to insert a panel member B in place, its bottom portion is first located between the pressed board member E and the outer portion of the clip D. Thereafter, the upper portion of the panel is pressed inwardly, the inner bevelled edge $B^2$ at the top of the panel engaging the adjacent bead on the clip D and forcing it together with the associated flange members to yield sufficiently to allow the panel member to snap into place, whereupon the clip and flanges will spring back into position with the bead on the clip engaging against the outer bevelled edge of the panel member (Fig. $2^a$). From this, it will be apparent that the material of which the channel members is made must be of a character sufficiently resilient and yieldable for the purpose.

It is proposed to employ stainless steel or some other non-corrosive metal for the clips D, in order to provide a handsome finish for the wall surface and, since the clip elements are separate from the channel members, the use of a metal of this character will not increase the cost of the construction to any appreciable degree. Attention is also called to the fact that the radius of the crown portion $D^4$ of the clips is substantially the same or greater than the distance between the outer edges of the flange members $C^2$ and the beginning of the corrugated portion $C^3$, in order that there may be additional relative movement here to permit the insertion of the panels. Actually, if it were desired to make the channel members of stiffer material, the beads on the clips D could be made to yield bodily at the base of the inclined portion $D^3$ and without any substantial deformation in the beads themselves, in order to allow for the insertion of the facing panels.

For finishing off the top of a section of facing (see Fig. 2), a clip $D^5$ could be used formed half in the same manner as the other clips $D^4$, and half with a flat portion $D^6$, somewhat longer and extending to the base portion $C^1$ of the channel member.

In actual practice, the dimensions of the parts are such that there will be a slight space F between panel members B and insulating slabs E in order to allow for expansion and contraction of the cooperating elements.

Another embodiment of the invention is illustrated in Fig. 3. Here the parts are the same as in Fig. 2, except that the corrugations in the flange members and clip members are dispensed with and instead the clip member is held in place by the insertion of a strip of industrial adhesive tape G between the legs of the clips and the adjacent surfaces of the flange members, the legs of the clips and the flange members here being perfectly plain and flat. In other respects, the construction is the same and the parts will operate in the same way when the panel members are inserted in place.

In Fig. 4, there is illustrated a construction, wherein panel members, here designated H, are held in place by the engagement of beads in grooves $H^1$ formed in the edges of the panel members intermediate the inner and outer faces thereof. The anchoring device is a channel member I formed with flanges $I^1$ somewhat shorter than those in the embodiments previously described, and terminating in yieldable beads $I^2$, which facilitate the insertion of the panel members. Here, too, the clip members J are provided, having rounded central portions or beads $J^1$ corresponding in shape with the grooves $H^1$ in the panels and being open at one end to facilitate snapping into place over the opposed beads $I^2$ of a pair of adjacent flanges $I^1$. At their other ends, the clips are U-shape in cross section, the outer portions thereof extending beyond the faces of the panel members H, as at $J^2$, and serving to give the construction a finished appearance. In this construction, the bead portions $H^1$ presented by the clips will yield along with the beads $I^2$ presented by the flanges $I^1$ when the panels are inserted in place, this action resulting by virtue of the fact that the inner ends of the clips are free and unrestrained and will merely slide along the adjacent flanges until the grooves in the panels register with said bead portions, whereupon the latter will assume their original shape, the resiliency of the metal being sufficient to allow this action to take place.

Figure 5:
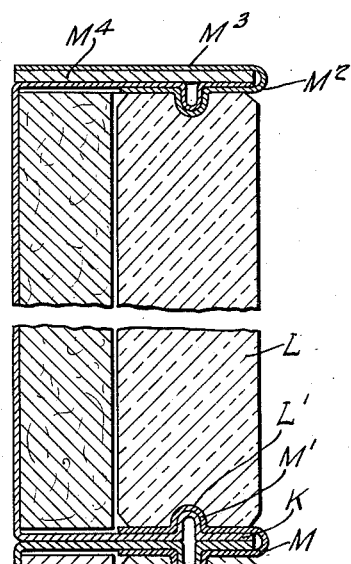

A modified form of the construction shown in Fig. 4 is illustrated in Fig. 5. Here, the flanges designated K, are somewhat longer and extend substantially to the outer faces of the panel members L. Bead portions $K^1$ on the flanges K are located inwardly from the outer edges of the flanges, and in this instance there are provided clips M formed with beads $M^1$ conforming substantially to the shape of the beads $K^1$ in the flanges, as well as to the shape of corresponding recesses $L^1$ formed in the panel edges. In this case, the flanges K and the associated clip M will yield as a unit as the panel member L is inserted in place.

A finishing clip $M^2$, for use with the construction shown in Fig. 5, is illustrated at the top. As shown, the clip is formed half in a manner similar to the other clips M and half with a flat portion $M^3$ extending rearwardly to the base of the channel member. In order that the exposed outer U-shaped portion of the clip $M^2$ have the same dimensions as the other clips M, a spacing element $M^4$ of suitable material is inserted between the outer face of the flange K and the flat portion $M^3$ of the clip.

In Fig. 7, there is illustrated a construction similar to that in Fig. 5, insofar as the flanges on the channel members are concerned. Instead of using clips however, industrial adhesive tape N is employed with adhesive on both sides, and which may be of any selected color as desired. The adhesive tape extends from the inner face of one panel member, across the edge thereof, out around the edges of the adjacent flanges and back across the opposed edge of the adjacent panel. In other respects, the construction is the same as that shown in Fig. 5, and the panel members are inserted in the same way.

Figure 6:
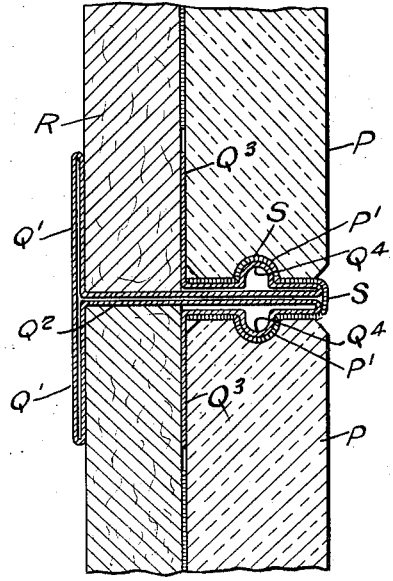

In Fig. 6, an embodiment of the invention is illustrated, wherein the channel members are dispensed with, and in their stead clip members Q are employed for supporting the panels P, and which are held in place by slabs R of press board or asbestos board insulating material. As shown, the clips Q include a base portion $Q^1$, a central flange portion $Q^2$ extending at right angles to the base portion, and a pair of flanges $Q^3$ extending in opposite directions at right angles to the central portion and in spaced relation with the base Q. Preferably, the clip is made from a single sheet of metal bent to form, in which case the base $Q^1$ will have a double thickness of metal, the flanges $Q^3$ a single thickness of metal, while the central flange $Q^2$ will have a double thickness rearwardly of the flanges $Q^3$ and a quadruple thickness forwardly thereof.

In erecting this construction, the slabs R of press board are inserted between the spaced portions $Q^1$ and $Q^3$ and are secured to the backing structure (not shown) in some suitable manner, by nailing for instance, should the backing construction be of wood. In that portion of the clip comprising four thicknesses, the outer layers are bent to present a pair of opposed beads $Q^4$ which engage in recesses $P^1$ formed in the edges of the panel members P and, to secure a tight joint, industrial adhesive tape S is used between the panel members and the clips. The adhesive extends around the outer edges of the clips and thus gives the effect of a pointed joint between the courses of tile panels. As in the other embodiments described, the panel members P are snapped into place between a pair of clips and, if desired, a filler of industrial adhesive tape may be inserted between the panel members and the press board slabs in the space presented as a result of the flanges $Q^3$, against which incidentally, the panel members rest in service.

In Fig. 8, there is shown a clip V, which includes a main portion $V^1$ formed of two thicknesses of metal bent back one upon the other, and having its outer end visible between the courses of panel members to present a suitable finished appearance. At the rear, the metal of the clip is bent at right angles to the main portion $V^1$ and then rebent upon itself to form flanges $V^2$ adapted to project into opposed slots T in the contiguous edges of two opposed slabs $T^1$ of press board. Initially, the rebent portions of the flanges $V^2$ are shaped as shown in dotted lines but, when the flanges are inserted in the slots T during erection, the rebent portions of the flanges will be pressed inwardly to conform to the dimensions of the slots, as shown in solid lines, and the resiliency of the metal will act firmly to hold the clips in place. The press board slabs $T^1$ may be nailed to the backing member, as in the embodiment previously described. The main portions $V^1$ of the clips present each a pair of opposed beads $V^3$ that engage into grooves formed in the edges of the panel members, and strips of industrial adhesive tape may be inserted between the clips and the panel members to hold the latter firmly in place.

The embodiment shown in Fig. 9 is somewhat similar to that shown in Fig. 8, except that the clips U are formed with rebent body portions $U^1$ spaced somewhat apart, in order to present a larger exposed finishing portion $U^2$ between the panel members. The body portions $U^1$ of the clip are held in spaced relation by the insertion of a spacing element $U^3$, which may be an asbestos cloth filler or some other suitable material. This filler, of course, must not be so stiff as to prevent the yielding of the outer portion of the clips as the panel elements are inserted in place.

In the accompanying drawings, the invention has been shown merely by way of example and in its preferred forms, and obviously, many variations and modifications may be made therein which will still be comprised within its spirit. It is to be understood, therefore, that the invention is not limited to any specific form or embodiment, except insofar as such limitations are specified in the appended claims.

Having thus described my invention, what I claim is:

1. In or for building construction, the combination of panel members arranged in courses and supporting devices for the courses of panel members located between the courses and presenting each a pair of oppositely extending beads engaging the panel members in adjacent courses at their edges to hold the same in place, and a portion adjacent the beads against which the panel members rest when in place, said supporting devices being yieldable rearwardly of the beads to allow the beads to be moved as a unit in permitting the panel members to be snapped into place between a pair of such devices, said devices also presenting visible portions between adjacent courses to lend a finished appearance to the construction.

2. In or for building construction, the combination of panel members arranged in courses and supporting devices for the courses of panel members located between the courses and presenting each a pair of oppositely extending beads engaging the panel members in adjacent courses at their front edges to hold the same in place, and a portion adjacent the beads against which the panel members rest when in place, said supporting devices being yieldable rearwardly of the beads to allow the beads to be moved as a unit in permitting the panel members to be snapped into place between a pair of such devices.

3. In or for building construction, the combination of a panel member and supporting devices for the panel member located at the edges thereof and presenting a pair of inwardly extending beads arranged to engage the opposite outer edges of said panel member and portions immediately adjacent the beads against at least one of which the panel member rests when in place, said devices being yieldable rearwardly of the beads to permit the panel member to be snapped into place between them, said beads being exposed to view and serving as a finishing strip along the edges of the panel member.

4. In or for building construction, the combination of a panel member and supporting devices for the panel member located at the edges thereof and presenting a pair of inwardly extending beads arranged to engage the opposite outer edges of said panel member and portions immediately adjacent the beads against at least one of which the panel member rests when in place, at least one of said devices being yieldable rearwardly of the bead thereon to permit the panel member to be snapped into place between the supporting devices, said beads being exposed to view and serving as a finishing strip along the edges of the panel member.

5. In or for building construction, the combination of a panel member, supporting devices for the panel member, separate elements associated with said devices and extending longitudinally therealong and presenting beads adapted to engage the edges of the panel member to secure the same in position, said separate elements having portions extending substantially to the rear face of the panel member, and means in said portions for securing the elements to the supporting devices.

6. In or for building construction, the combination of panel members arranged in courses, devices located between the panel members for supporting the same, and separate elements associated with said devices and presenting each a pair of oppositely extending beads adapted to engage the edges of panel members in adjacent courses, said separate elements extending between the panel members and being secured to the supporting devices.

7. In or for building construction, the combination of panel members arranged in courses, supporting devices for the panel members including channels arranged one alongside the other, and with adjacent flanges in close proximity, and a clip extending between the panel members and secured to the adjacent flanges of a pair of channel members, said clip presenting beads engaging the edges of panel members in adjacent courses to hold the same in position.

8. A combination according to claim 7, wherein the clip is secured to the flanges by interengaging portions on the clip and flanges.

9. A combination according to claim 7, wherein the clip is secured to the flanges by a strip of adhesive material.

10. A combination according to claim 7, wherein the clip is secured to the flanges by interengaging complementary corrugated portions on the clip and flanges.

11. A combination according to claim 7, wherein the clip is secured to the flanges by beads on the flanges arranged to engage in portions of the clip adapted to receive them.

12. A combination according to claim 7, wherein the clip and the interposed flange members are yieldable as a unit to permit the panel members to be inserted in place.

13. A combination according to claim 7, wherein a portion of the clip member is visible between a pair of adjacent panel members and extends longitudinally of the panel members to serve as a finishing strip between courses.

14. A combination according to claim 7, wherein the clip is snappable into position on its associated flange members.

15. In or for building construction, the combination of panel members arranged in courses, clips extending longitudinally of the panel members and positioned between the courses and presenting opposed beads adapted to engage the panel members to secure them in position, said clips being yieldable to permit the panel members to be snapped into position therebetween, slabs of insulating material arranged at the rear of the panel members, and means on the clips cooperating with a pair of adjacent slabs for securing the clips in a fixed parallel arrangement.

16. In or for building construction, the combination of panel members arranged in courses, clips extending longitudinally of the panel members and positioned between the courses and presenting opposed beads adapted to engage the panel members to secure them in position, said clips being yieldable to permit the panel members to be snapped into position therebetween, slabs of insulating material arranged at the rear of the panel members, and means on the clips including a pair of oppositely extending flanges adapted to cooperate with the slabs for holding the clips in fixed parallel relation.

17. In or for building construction, the combination of panel members arranged in courses, clips extending longitudinally of the panel members and positioned between the courses and presenting opposed beads adapted to engage the panel members to secure them in position, said clips being yieldable to permit the panel members to be inserted in position therebetween, slabs of insulating material arranged at the rear of the panel members, and means on the clips including a pair of oppositely extending flanges adapted to engage in slots in the opposed edges of a pair of adjacent slabs for securing the clips in a fixed parallel relation.

18. In or for building construction, the combination of panel members arranged in courses, clips extending longitudinally of the panel members and positioned between the courses and presenting opposed beads adapted to engage the panel members to secure them in position, said clips being yieldable to permit the panel members to be snapped into position therebetween, slabs of insulating material arranged at the rear of the panel members, and means on the clips including a pair of oppositely extending flanges having rebent portions and engaging in slots formed in the opposed edges of a pair of adjacent slab members, the resiliency of the rebent portions being adapted firmly to hold the flanges in a fixed position in said slots.

19. In or for building construction, the combination of panel members arranged in courses, clips extending longitudinally of the panel members and positioned between the courses and presenting opposed beads adapted to engage the panel members to secure them in position, said clips being yieldable to permit the panel members to be snapped into position therebetween, and slabs of insulating material arranged at the rear of the panel members in which the clips are secured, said clips having portions extending to the outer faces of the panel members to present a visible finishing strip between adjacent courses thereof.

20. In or for building construction, the combination of a panel member, supporting means for the panel member, and tape provided with an adhesive material located between the panel member and the supporting means for securing one to the other.

21. In or for building construction, the combination of a panel member, supporting means for the panel member, and tape provided with an adhesive material on both sides, and located between the panel member and the supporting means for securing one to the other.

CHARLES G. DUFFY.